Inventor
Jacob Stein
Morris Katcher
Attorney

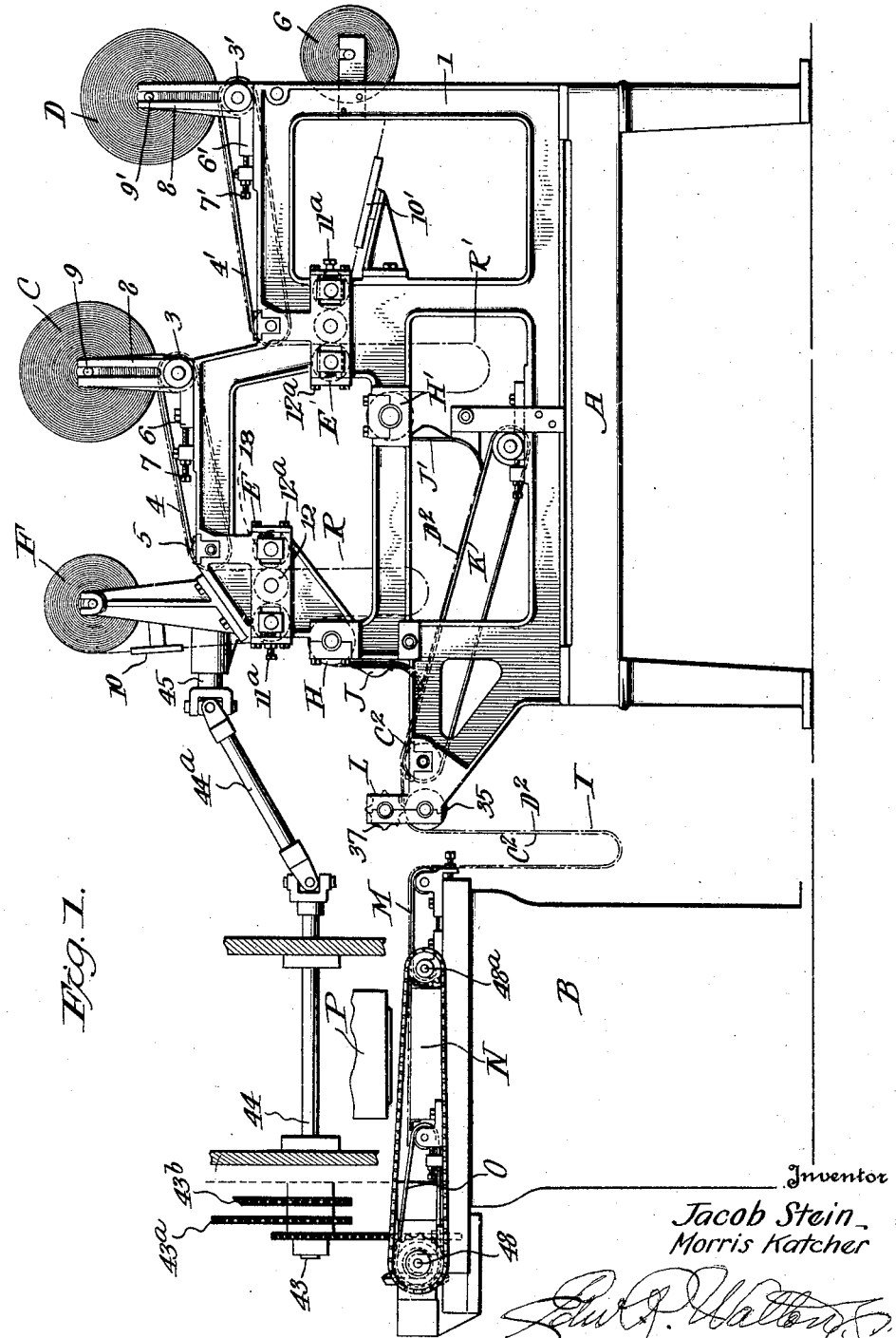

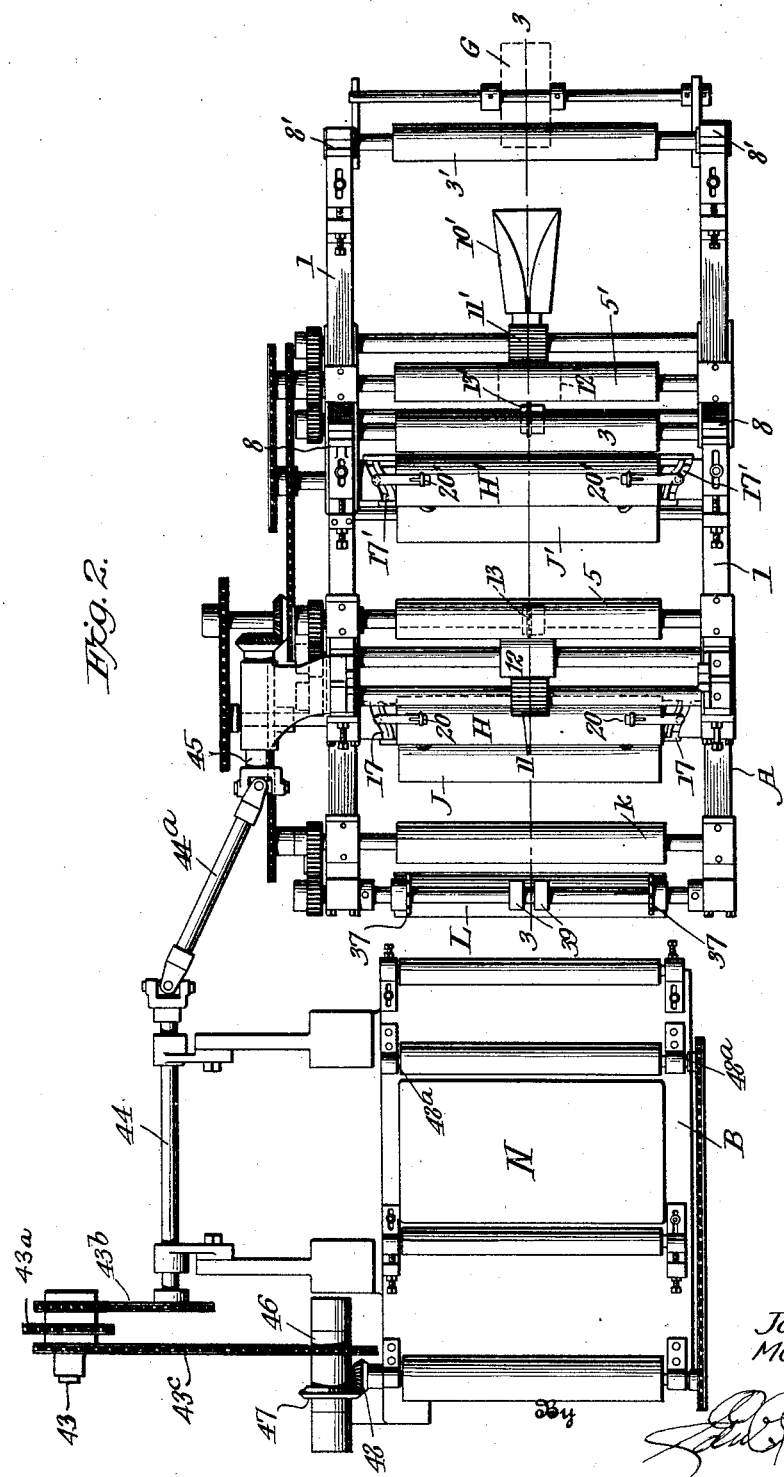

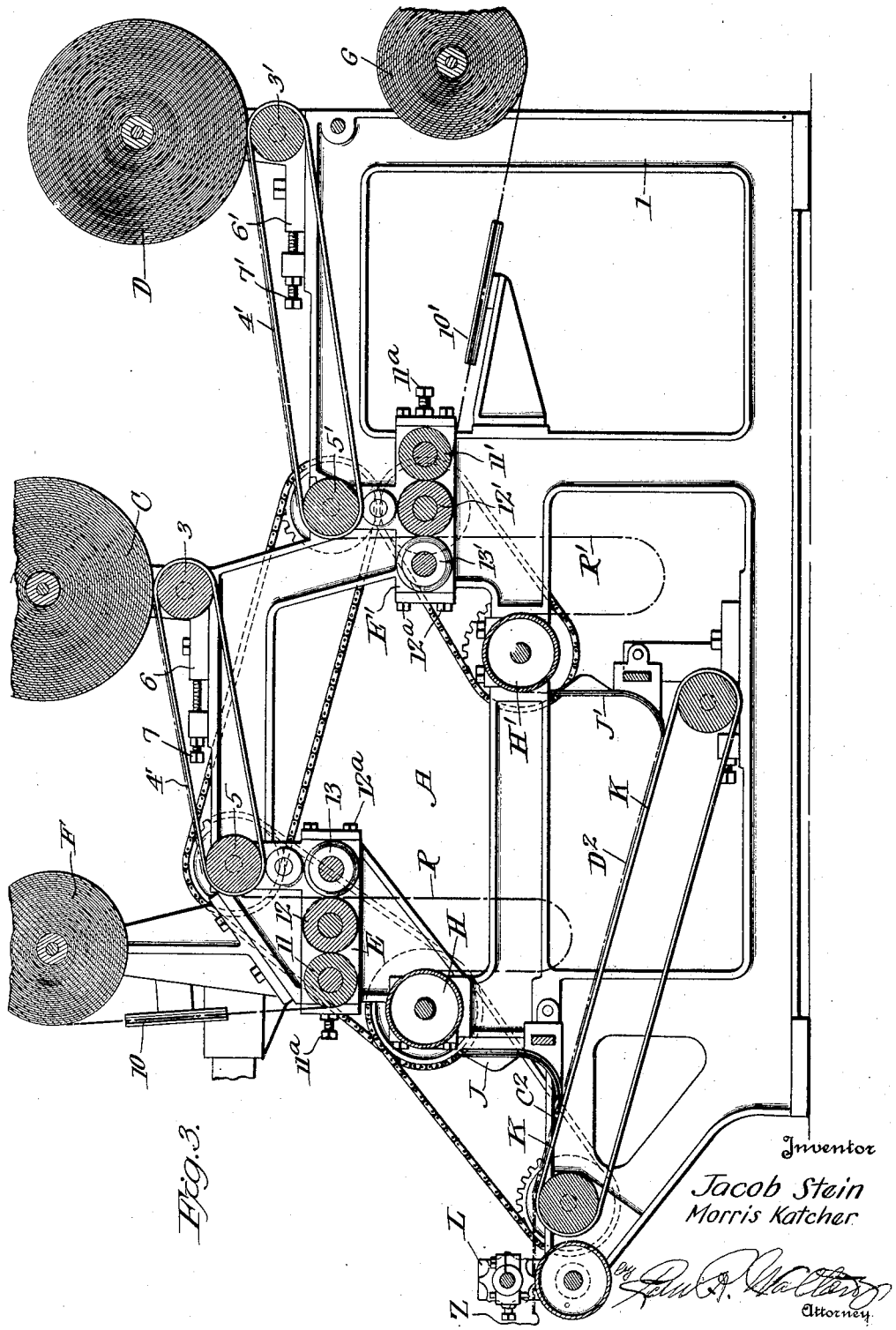

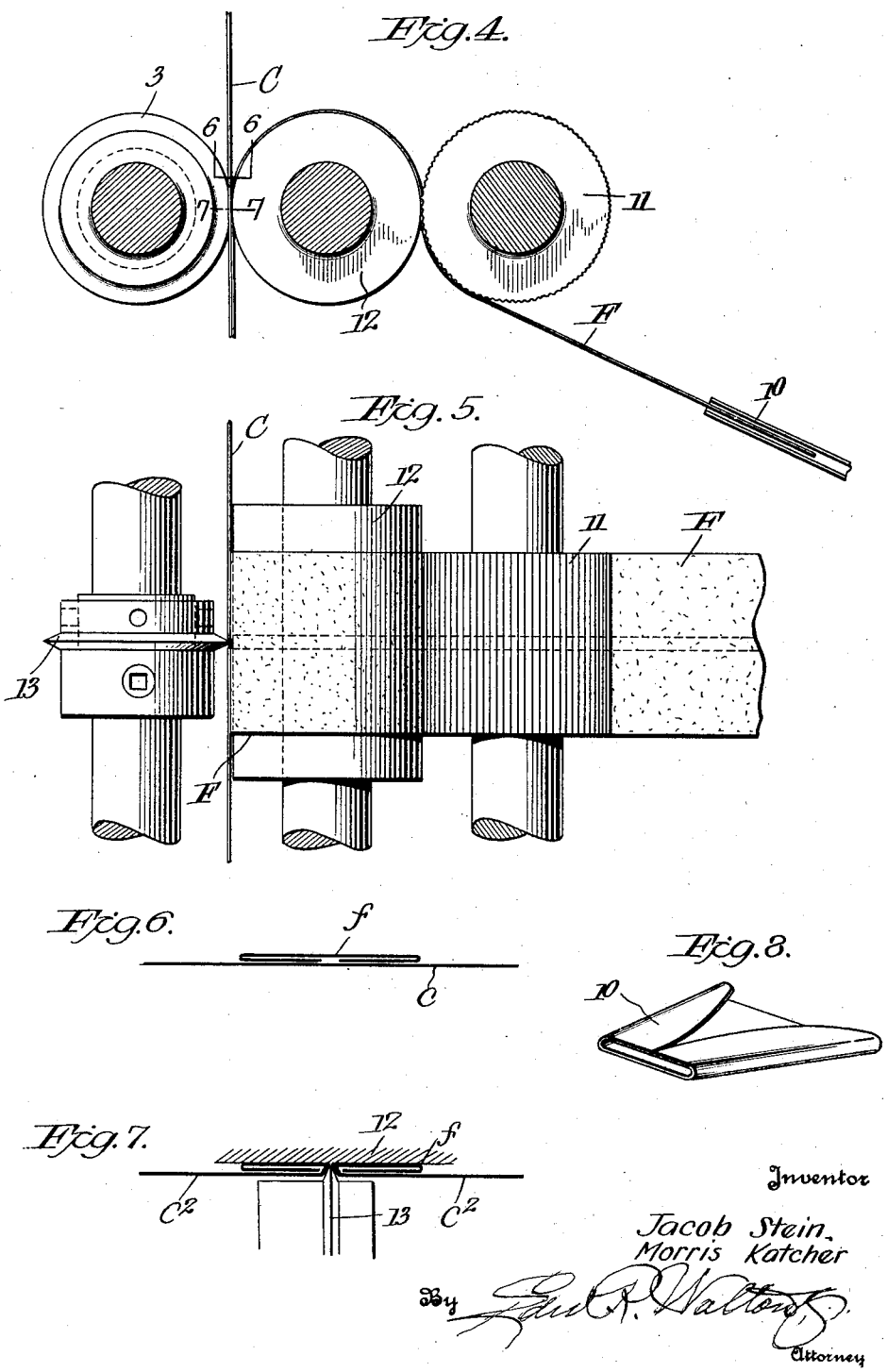

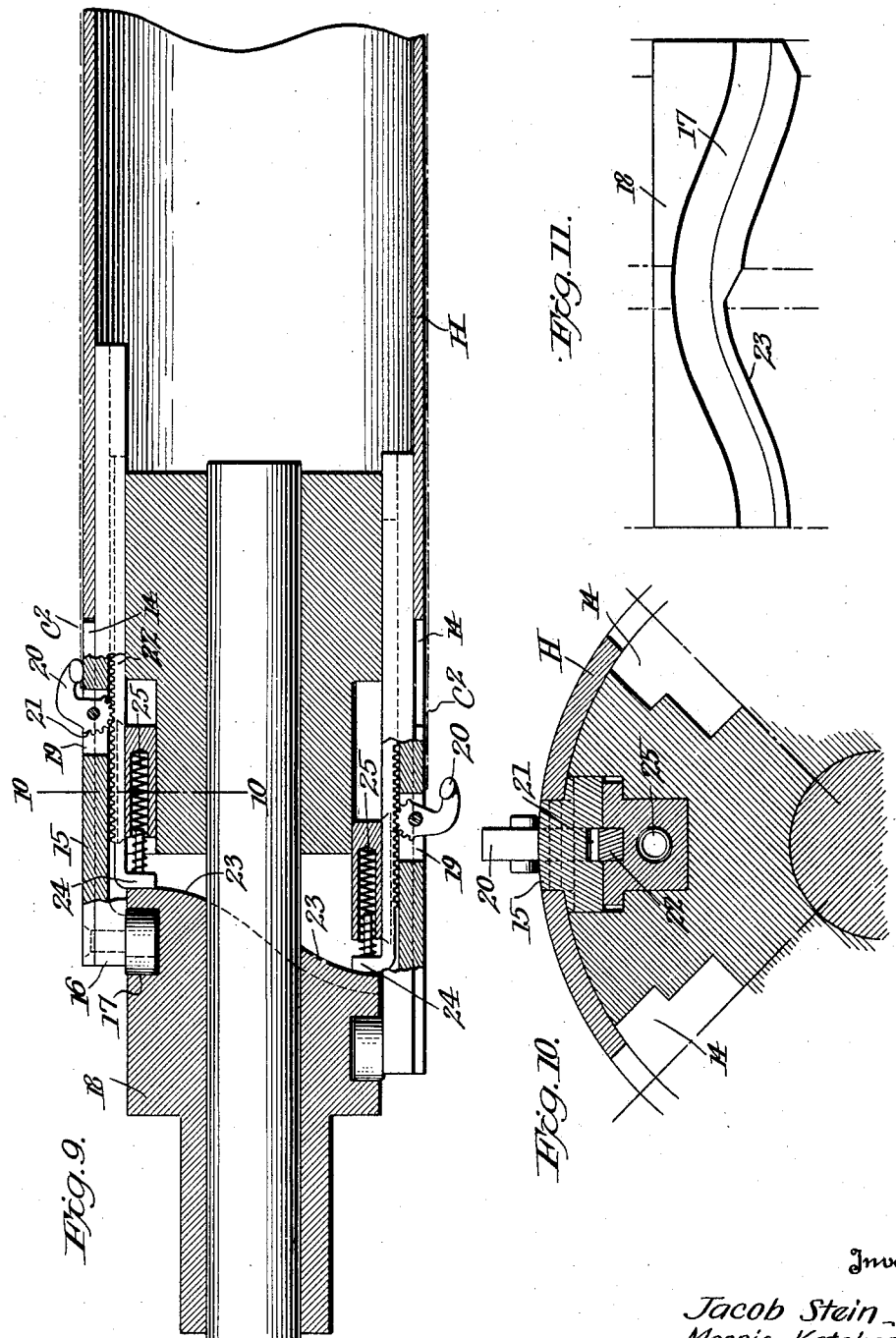

Feb. 11, 1930.   J. STEIN ET AL   1,746,845
APPARATUS FOR MAKING BATHING CAPS AND ANALOGOUS ARTICLES
Filed May 7, 1927   8 Sheets-Sheet 7
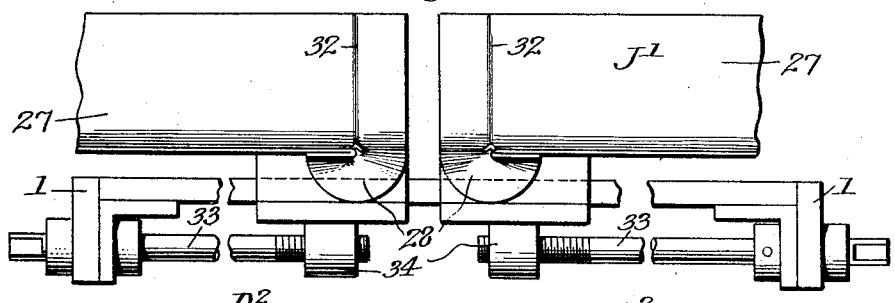
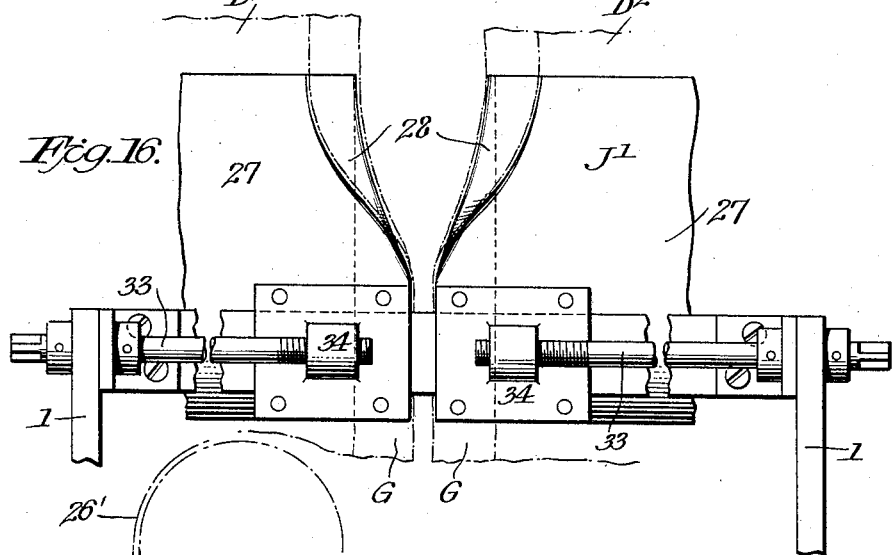
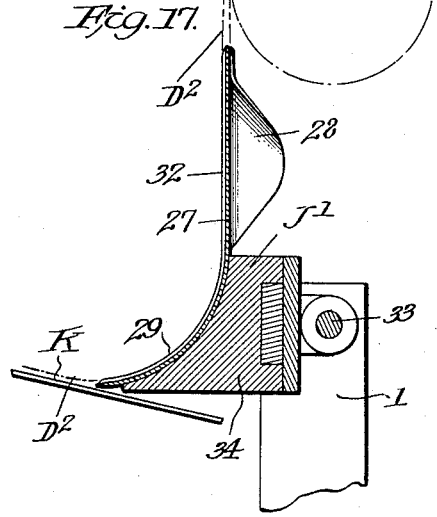
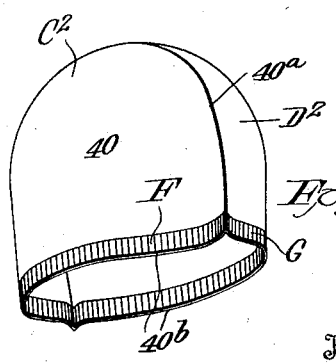
Inventor
Jacob Stein
Morris Katcher
By  [signature]
Attorney Feb. 11, 1930.  J. STEIN ET AL  1,746,845
APPARATUS FOR MAKING BATHING CAPS AND ANALOGOUS ARTICLES
Filed May 7, 1927  8 Sheets-Sheet 8
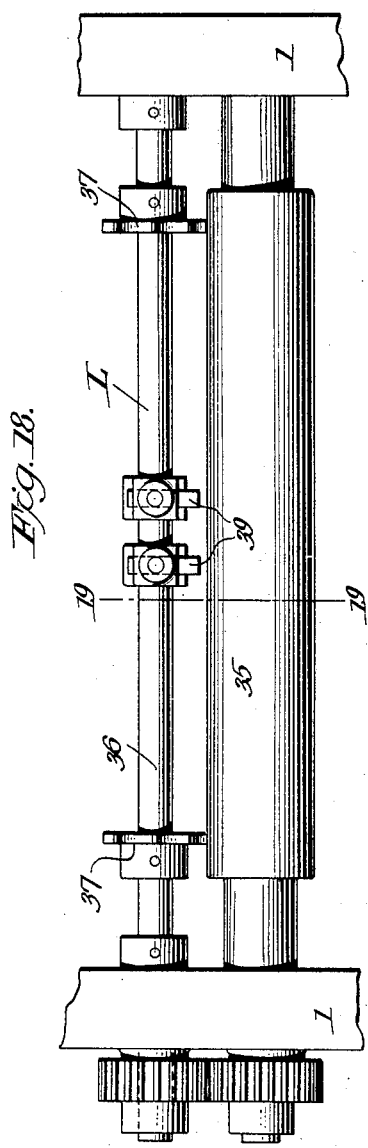
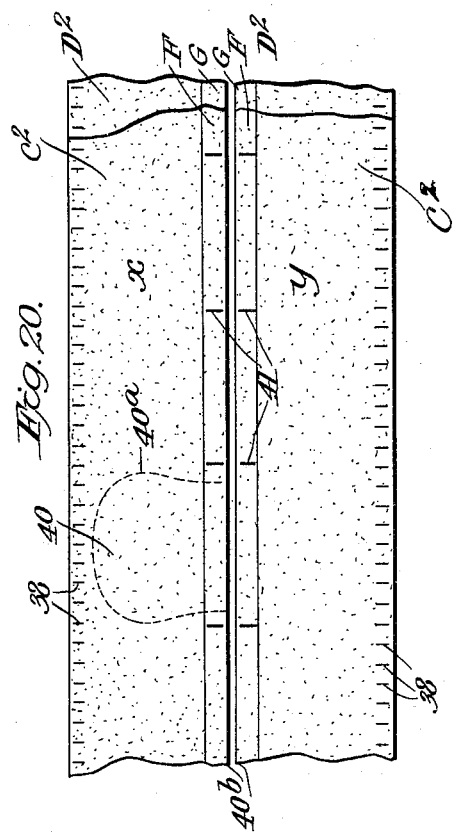
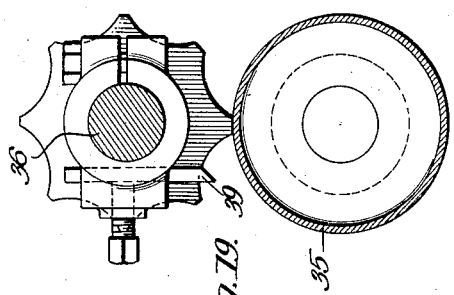
Inventor
Jacob Stein
Morris Katcher
By
Attorney Patented Feb. 11, 1930

1,746,845

UNITED STATES PATENT OFFICE

JACOB STEIN AND MORRIS KATCHER, OF NEW YORK, N. Y.; SAID KATCHER ASSIGNOR TO SAID STEIN

APPARATUS FOR MAKING BATHING CAPS AND ANALOGOUS ARTICLES

Application filed May 7, 1927. Serial No. 189,725.

The present invention is an apparatus for the production of so-called "bathing caps," which are generally made up of impervious sheet material, such as rubber, and used for maintaining the hair or head dry while bathing, but the present invention relates more particularly to the production of so-called "shower-caps," that is, of the skull fitting type, usually having a border of different colored material. However it is to be understood that other types of caps within reasonable limits may be produced by the present invention with or without the different colored border.

It is well known that various apparatus have been proposed for the making of such caps, but they are expensive, slow and unsatisfactory from the standpoint of accuracy and quantity production and in some instances require manual aid or operations in their performance.

The main object, therefore, of the present invention is an apparatus by which two or more caps may be made in automatic continuous production from a web of opposed sheets of material.

A further object of the invention includes the continuous automatic production of two or more caps or other articles simultaneously from a web of opposed sheets of material having a border of differently colored material; and, further, in the provision of a comparatively simple and economical machine for this purpose.

The apparatus employed to accomplish the above purposes broadly includes means for maintaining two sources of supply of sheet material to form the body of the caps or article to be produced, and which are fed in opposed relation or face to face, and means for cutting from the opposed sheets the article to be produced in a continuous operation and, when the sheet material is unvulcanized rubber, the severed edges of the opposed sheet portions forming the article being joined together by means of the cutting operation.

More specifically the apparatus includes means for applying narrow band strips to the body sheets longitudinally along medial lines thereof; a cutting or splitting device operable along said medial lines for severing both the band strips and the body material and securing the adjacent edges of the band and body material together, when these materials are of unvulcanized rubber; means for spacing apart the severed edges of said body material; means for unfolding the band strips to form an extension of the body material; and means for delivering such severed or divided portions of each sheet of body material into face to face relation with like portions of another sheet of body material, whereby a plurality of article forming strips are produced. Each of these article forming strips consist of two superposed sheet sections having unfolded border extensions from which is cut the desired article.

One form of the apparatus for accomplishing the above objects is shown in the accompanying drawings, but the invention is not limited to the form and construction illustrated, because it is capable of being embodied in other forms of construction; it being understood that in and by the claims following the description herein, it is intended to cover the invention in whatever manner the same may be embodied within the scope thereof.

Referring in detail to the drawings, which illustrate the preferred embodiment of the apparatus as at present devised:

Figure 1 is a side elevation of the apparatus of this invention;

Figure 2 is a plan view of the apparatus as shown in Figure 1;

Figure 3 is a vertical longitudinal sectional view of the apparatus taken substantially on line 3—3 of Figure 2;

Figure 4 is an enlarged detail sectional view of the mechanism for folding and applying the band to the body material of the cap and for severing the band and the body material;

Figure 5 is a plan view of the mechanism shown in Figure 4;

Figure 6 is a transverse sectional view of the band and body material taken substantially on line 6—6 of Figure 4, prior to being severed and showing the band material having its longitudinal edge portions folded inwardly upon itself;

Figure 7 is a transverse sectional view of the band and body material taken substantially on line 7—7 of Figure 4, showing the manner in which the same is severed and the adjacent edges of the band and body material joined together by the severing operation.

Figure 8 is a perspective view of the band folder.

Figure 9 is a fragmentary sectional view taken through one end portion of the spreading device for spacing the severed sections of the body material, and showing in detail the operating parts of the shiftable gripping fingers;

Figure 10 is a transverse sectional view taken substantially on line 10—10 of Figure 9;

Figure 11 is a diagrammatic plan outlay of the finger operating cam grooves on the spreader device;

Figure 15 is a top plan view of the device for unfolding the band strip on the lower body sheet sections;

Figure 16 is a rear elevation of the unfolder shown in Figure 15;

Figure 17 is a vertical sectional view to show detailed construction of the unfolder illustrated in Figure 16;

Figure 18 is a plan view of the piercing or rubber stitching device for joining the opposed sheet sections together;

Figure 19 is a transverse sectional view taken substantially on line 19—19 of Figure 18;

Figure 20 illustrates the position and condition of the two cap forming strips at the time they pass from the assembling unit to the cap cutting unit, the portion from which the caps are cut being indicated by dotted lines; and Figure 21 is a view of the completed cap.

Figure 12:
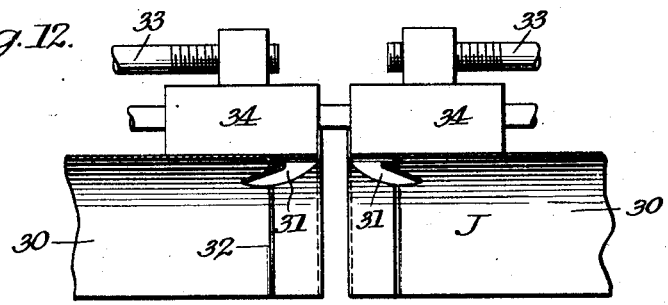
Figure 12 is a top plan view of the device for unfolding the band on the upper body sheet sections.
Figure 13:
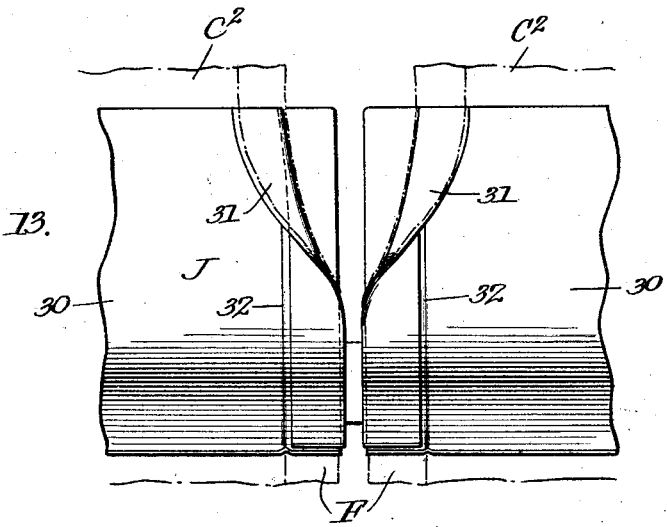
Figure 13 is a front elevation of the unfolder shown in Figure 12.

It should be here stated that the apparatus herein shown for practicing the invention, is designed to produce caps economically and speedily by making two caps at a time but may be designed, by duplication of mechanism, to produce any reasonable number of caps at one time, it also being with the perview of the invention to produce one cap at a time in continuous production.

Referring in detail to the drawings, reference is first had in Figures 1, 2, and 3 which illustrate the assembled machine consisting of the material assembling unit A, and the cap cutting or stamping unit B, although these two units may be incorporated in one frame structure, if found desirable.

The material assembling unit A comprises two spaced side frames 1 for supporting the various parts and mechanism of the unit and may be of any suitable shape or design or construction for this purpose, although the arrangement and design illustrated presents one of the preferred arrangements. The side frames support two supplies C and D of sheet material, preferably in roll form, which are fed through the assembling unit to its point of discharge, I, from the unit, at which point they are in superposed, or face to face, relation and in condition to have the caps cut therefrom, preferably by the cutting unit B.

In accordance with the present disclosure the sheets of material C and D are of a width at least that of the double depth of the cap to be made and are divided longitudinally in the separate sections, the material of one section from each of the sheets C and D being brought in opposed relation to form half of the cap, thus enabling production of two caps simultaneously from sheet width of suitable material, which in the present instance is unvulcanized sheet rubber.

The roll or bolt C is held in suitable spaced bearings on the frame 1 at the front top portion of the frame and feeds to a material splitting and uniting mechanism E, where it is cut longitudinally into two (or more) strips of substantially equal width. It is found, in feeding the unvulcanized rubber sheets to the mechanism E, better results are obtained if the material roll is positively rotated; and to this end the roll C rests upon a supporting roll 3 forming one end of an endless belt conveyor 4, having its other end roller 5 overlying the mechanism E. Thus, it will be seen that the material roll C is in direct contact with the conveyor belt 4 and is rotated by the same which carries the said rubber sheet therefrom directly to the splitting mechanism.

The roller 3 is journalled in bearing blocks 6 slidably mounted on the frame members and adjustable, as at 7, to vary the tension on the conveyor 4. From each of the blocks 6 rises a slotted bracket 8 in which slot the core or shaft 9 of the roll C is inserted to hold the roll against lateral displacement, but permitting vertical movement of the core to compensate for the decreasing diameter of the roll C as it is being unwound. The conveyor 4 may be eliminated in some designs of the machine by arranging the mechanism E directly under the rolls or bolts of sheet material C and D.

A strip of reinforcing band material is fed and applied longitudinally to each of the sheets of material C and D, respectively, and is arranged centrally along the line or lines said sheets are to be split or severed by the mechanisms E and E', the band material being preferably supported in roll form on the frame and fed to said sheet material by rollers forming part of the mechanisms E and E', the band material F being applied to one face of sheet material C and the band strip G being applied to one face of the sheet material D.

Referring particularly to sheet material C and the band strip F, the latter is fed through a folder 10 interposed between the roll C and the cutting mechanism E. The folder 10 is the ordinary and well-known "edge folder," shown in detail in Figure 8, and folds the marginal edge portions of the band strip F toward the longitudinal center of the strip. In this condition the band strip passes between feed rollers 11 and 12 which also press the folded portions of the strip into intimate contact or adhesion. The strip passes about to roller 12 to meet or join the sheet C where both are simultaneously severed or split by the rotary knife 13 acting against the roller 12, as clearly shown in detail in Figures 4 and 5. The knife 13 is positioned to sever the sheet C and band F in longitudinal halves $C^2$, the pressure of the knife on the severed edges of the sheet and band material causes the severed edges on opposite sides of the kerf of the strip F to be pressed against the corresponding severed edge of the sheet C and firmly united together, as clearly shown in Figure 7 and well known in the rubber art.

After having thus severed the sheet C and the strip F and united their adjacent severed edges, they pass from the severing mechanism E to a separating or spreading device which in the present instance is in the form of a roller over which the severed material passes, there being a loose loop R of the material provided between the mechanism E and the spreader H to avoid strain and pull on the material by temporary discrepancies in feeding of the material.

The function of the spreader H is to separate the severed sections $C^2$ of the sheet C so as to provide sufficient distance between the severed edges of the sheet to permit the split band strips F, which have been secured to each of the severed edges of the sections $C^2$ (by the action of the knife 13) to be unfolded with respect to its sheet section and provide a marginal extension thereof. Of course, in such incidences where it is not desired to unfold the band strip, the spreader device H and the following unfolding device J may be eliminated; and, in like manner, when multiple production of caps is not desired the rotary knife 13 of the splitting mechanism E may have a pressure roll substituted therefor.

The unfolder J may be of any suitable and desirable construction for the purpose above defined and, in this unfolded condition, the sheet sections $C^2$ are placed on to a conveyor K on top of a similar set of sheet sections $D^2$ discharged on the conveyor previously from the unfolder J' and which have undergone the same operation as the sheet C and band strip F through a similar set of mechanisms as those just described and denoted by the same reference characters, but distinguished by the exponent prime ('). The only difference between the two sets of mechanisms is that the reinforcing band strip F is placed on the top or upper side of the body sheet C, whereas the reinforcing band strip G is placed on the opposite or underside of a body sheet D; but this is not essential, except when the unfolders J and J' are omitted and it is desired to provide the cap with an exterior reinforced band of different color from the body sheet material.

Provision is made to join the assembled upper and lower (or opposing) sheet sections $C^2$ and $D^2$ (of the sheets C and D, respectively,) together by what is known in the rubber art as "stitching," and consists in pressing or piercing the sheet sections at intervals in places which are afterwards cut out as scrap. This stitching mechanism is indicated at L and is positioned at the discharging end of the continuous conveyor K. The two sets of sheet sections, thus joined together, form what are termed cap strips $x$ and $y$, and are passed to an intermittent conveyor M on the cutting unit B, which delivers the sheet sections on to an anvil with which opposing dies co-operate for stamping or cutting out the caps in any desired shape, but, as here shown, in the form of a semi-oval producing a skull fitting cap, the opposing sections $C^2$ and $D^2$ of the sheets C and D, respectively, forming opposite sections or halves of the cap 40 (see Figures 20 and 21).

The cutting or stamping of the caps from the cap strips $x$ and $y$ is similar to the action of the knife 13 in that the adjacent severed edges of the cap sections are united together by the severing operation. The line of severance $40^a$ of the cap cutting dies or devices intersects the edge $40^b$ of the reinforcing band strips F and G, which have been folded upon themselves by the folders 10 and 10' (see Figures 4, 6, 7 and 8) to provide a double thickness of the band strips to reinforce the head opening which is formed by the free edges of the band strips (see Figure 21). The sheet sections thus operated, upon passing from the anvil N to an intermittent conveyor O which discharges the sheet from the unit B, whereafter the cut or punched portions of the sheet sections providing the caps 40 are removed from the scrap or remaining portion of the sheet sections either by hand or by other suitable means. The caps are then subjected to vulcanization.

Referring more specifically to the various mechanisms employed in this machine, it is pointed out that the roller 11 of the splitting mechanism E is corrugated and yieldably mounted to bear upon the smooth roller 12 for the purpose of suitably corrugating, or otherwise decorating, the band strips F and G prior to being severed and joined with their respective sheet sections C² or D² by knife 13. Also, the knife 13 is yieldably mounted to bear against the roller 12, the pressure with which the roller 11 and knife 13 bear against the roller 12 being adjustable by screws 11ᵃ and 12ᵃ, respectively.

The spreading mechanisms H and H' are in the form of revolving rollers having mechanisms at each end designed to grip the outer side edge of the severed sheet sections and pull them apart slightly more than double the width of the reinforcing bands on their inner edges.

In the present construction of the device each end of the rollers H and H' is provided, as shown in Figures 9, 10, and 11, with a plurality of axial slots 14 arranged at equal distances apart circumferentially of the roller.

Each of these slots 14 has slidably mounted therein a block 15 having a lateral projection 16 at its outer end extending into a cam groove 17 in the fixed hubs or bushings 18 in which the rollers H and H' are journalled. The cam grooves 17 are formed to reciprocate the blocks successively, each making a full reciprocation on each revolution of the roller, the blocks being moved to innermost position at the point where the sheet sections C² or D² first contact with the roller, and to the outermost position at the point where said sections leave the roller, as clearly shown in Figure 9 and in Figure 11 illustrating diagrammatically the cam groove 17 and face cam 23. Each block 15 has pivotally mounted therein, preferably in a recess 19, a gripping finger 20 of goose-neck formation pivoted at one of its ends, the other end extending out of the recess and overlying the inner edge thereof, as clearly shown in Figure 9. The pivoted end of the finger is provided with a segmental rack 21 meshing with a finger actuating rack bar 22, also slidably mounted in the block 15.

Thus, it will be seen that the gripping fingers 20 will be oscillated as the blocks 15 reciprocate. The fingers 20 are, however, arranged to be in gripping relation with the upper exposed surfaces of their respective blocks 15, when each is in its innermost position, and remaining in this gripping relation while the block travels to its outermost position when it opens to release the spread spaced portions of the sheet section C² or D². Positive and definite quick opening and closing movements of the finger 20 is obtained by the independent inward or outward shifting movement of the rack bar 22 occasioned by one of its ends engaging the face-cam 23 on the adjacent bushing 18, which face cam is substantially coincident with the cam groove 17, except at the points of dwell, or limits of inward and outward movement, where the face cam is abruptly inclined, as indicated in Figure 11, the cam engaging member 24 on the rack bar 21 being yieldingly urged against the face cam 23 by compression spring 25 maintained in a recess in the block 15.

While only one block 15 and its gripping finger 20 have been described, the remainder of the blocks 15 are of similar construction and operate identically. Consequently, it will be manifest that as the spreading rollers H or H' revolve, the fingers 20 thereof will be successively moved inwardly and grip the outer edge of the severed sheet sections C² or D² of cap material, and will then move outwardly, during about one-half revolution of the rollers H and H', to space apart the opposing inner edges of said sections as they are continuously fed over the roller, until the outermost position of the blocks 15 is reached and the cam actuated rack bar 22 successively shifts the fingers 20 to opened or nongripping position, thereby releasing the spaced sheet sections.

After the sheet sections C² and D² have been spaced apart, as above described, they pass to the band unfolding devices J and J', which are substantially the same in general construction, the unfolder J unfolding the split band strips F which have been applied on the upper side of the sheet material C while the unfolder J' unfolds the split band strips G which have been applied to the underside of the sheet material D. For convenience the unfolder J' will be first referred to and comprises a pair of substantially flat plate members 27 arranged in substantially the same plane and each positioned to have one of the two spaced sections D² of the severed sheet material D move thereover, the inner adjacent edges of these plates being folded on themselves or so formed to provide obliquely converging flanged edges, the intermediate portions of the flanges 28 being raised from the plates with their ends merging into the plate. As the spaced sheet sections D² approach the diverging ends of the flanges 28, said end of the flanges insert themselves, respectively, between the fold of the band and the body material, as clearly shown in Figure 16, and unfolds the same as it is moved forwardly through the unfolder J'.

Figure 14:
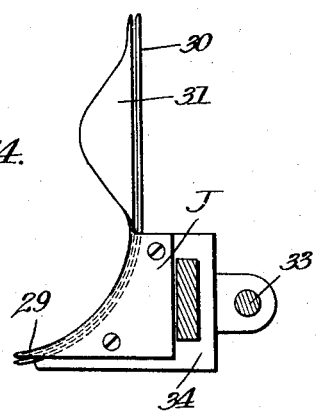
Figure 14 is a side elevation of one of the unfolder plates looking toward the inner edge thereof.

The plates 30 of the folder J differs from the plates 27 by not being bent or formed to produce the unfolding flanges 28, but provided with separate flanges 31, one arranged opposite and at an angle to the front surface of each plate 30 and slightly spaced therefrom. This construction permits the split sections of the sheet C to pass between the plate 30 and the flanges 31 with the latter inserted between the folded split band sections F and the body sheet section, thus unfolding the bands. The plates 27 and 30 each are preferably formed with a guide rib 32 positioned to engage the seams connecting the split band sections F and G and the sheet material, thus tending to guide the sheets through the unfolding devices and preventing lateral shifting movement. The plates 27 and 30 are each held in position by supporting bolts or rods 33 rotatably mounted in the adjacent side frame members 1 and having a threaded connection with bosses 34 on the bottom of the plate, thereby permitting the plates to be adjusted relative to each other to obtain the desired degree of separation between the opposing edges of the sections $C^2$ and $D^2$. The discharge ends of the unfolder plates 27 and 30 are preferably curved at 29, shown in Figures 14 and 17, to guide the sheet sections on to the conveyor K, the sections $D^2$ of the sheet D being lowermost and the sections $C^2$ of the sheet C being discharged upon the sections $D^2$ so that the upper and lower sheet sections will lie coincident with each other.

At the end of the conveyor K, the superposed sheet sections $C^2$ and $D^2$ are secured together at intervals so as to insure the coincident alignment during the cap cutting operation in the cutting unit B; and, to this end, a suitable rubber stitching mechanism L is provided which consists of a smooth hard roller 35 and an opposing shaft 36 having star wheels 37 fast thereon and disposed at its ends. The sheet sections pass between the roller 35 and the star wheels 37, whereby the star wheels punch or press the two sets of superposed sheet sections together along their outer edge, as indicated at 38 on Figure 20.

The inner edges of the sheet sections may be secured together by suitable punch members 39 fast on the shaft 36 between the star wheels 37 and so arranged as to contact with the sheet sections between the portions 40, which form the caps, and as indicated at 41.

While in the present disclosure only one mechanism is shown and described for splitting the body sheet material C and D into sections and it is to be understood that any number of splitting mechanisms E or E', unfolding mechanisms J or J', set of spreading fingers 20 on the mechanisms H and H', or stitching devices 37 and 39 on the mechanisms L may be used for handling sheets of material split into more than two sections so that more than two caps may be made at the same time. It is also to be understood that while unvulcanized rubber is referred to, other sheet material may be used with facility and by the substitution of equivalent and appropriate means for joining the separate material elements forming the cap together where necessary.

The two sets of cap strips $x$ and $y$ are fed from the assembling unit at a continuous speed to form a loose loop I, and from this loop to intermittently operating conveyors M and O between which is the cutting anvil N aligned with reciprocating cutting dies P operating thereagainst to cut or stamp out the cap 40 from each of the cap strips $x$ and $y$, during the period of rest of the strips over the anvil.

In the machine here shown, the cutting unit B and the assembling unit A are operated from the same source of power as to insure synchronism of movement of the materials passing through the two units, the power being taken from a common source and is transmitted to a shaft 43 by a chain or the like $43^a$, and then by the chain $43^b$ to the shafts 44 and $44^a$ to a shaft 45 on the assembly unit from which suitable gearing is provided for actuating the rollers 5 and 5', the rollers of the cutter mechanism E and E', the spreading rollers H and H', the conveyor K and the stitching device L, clearly illustrated in Figure 2. The intermittent movement of the conveyors M and O, which is synchronized to co-operate with the reciprocating movement of the cutting dies P, is taken from the shaft 43 and conveyed by the chain $43^c$ to the shaft 46 carrying a mutilated bevel gear 47 to the shafts 48 and $48^a$. It will be understood, however, that while the feeding of the material from assembling unit A is continuous the same amount of material will pass through the cutting unit B in the same given time, this being compensated for by the loose loop I. Of course, a rotary cutter may be substituted for the reciprocating cutters P in which case the conveyors M and O may operate continuously.

From the above it is obvious that by the method and apparatus here described, it is possible to make one or more caps from a width of sheet material at one time with a single operation, thus permitting automatically quantity production in a more economical manner than has been previously practiced, without requiring any manual operations or handling whatsoever during the process of making from the entry of the sheet material into the machine until the cap is finally produced. The product or cap is uniform in appearance and in quality and its cost is much less than can be produced by other known methods and apparatus.

When one cap is made from a single width of material the mechanism remains the same except that the width of the rolls of material C, D, F and G is approximately one-half of the width shown in Fig. 20 and fed from only one side of the roller spindles or shafts 9 and 9'. Since it is difficult with soft flexible materials such as fabrics and rubber to feed the sheets so that their edges will be in perfect alinement, the rolls of material are of such width that their inner edge will be fed to the cutting knives 13 and 13' so as to trim the inner marginal edge portion of the sheets or roll material and produce a true straight edge. However, it is clear that when a double width of material is used to produce two caps, the knives 13 and 13' will split the sheet material along their longitudinal center.

It will be further understood that it is within the scope of the present invention to construct machines or manufacture caps with or without the band strips or to omit the band strip unfolding devices so that the band strip will not form an extension of the body material of the cap.

Having thus described the invention and in what manner the same is to be performed, that which is claimed as new is:

1. A machine of the character described comprising means for feeding two sheets of material therethrough and associating said sheets in superposed contiguous relation, means for applying a marginal band strip to the outer face of each sheet at an edge thereof, and means for cutting said superposed sheets on a line intersecting at two points the marginal strips thereof and said edges carrying said strips, so that an article is produced by said cutting operation having an opening formed by the intersected edges.

2. A machine of the character described comprising means for feeding two sheets of rubber to opposed juxta-relation, means for applying and attaching a marginal band strip to the outer face of each sheet at an edge thereof, and means for cutting said opposed sheets at spaced intervals along their length on a line which intersects at two points the marginal strips thereof and said edges carrying said strips, said cutting means joining the severed edges of the opposed sheets together during the cutting operation so that an article is produced having an opening formed by the intersected edges.

3. A machine of the character described comprising means for feeding two sheets of rubber to superposed juxta-relation, mechanisms arranged in advance of the point of sheet association for applying a narrow band strip along a medial line of each sheet and severing said sheets and strips along a medial line of the latter and joining the severed edges of said opposing strip and sheet sections, and means for cutting each pair of superposed sheet sections on a line intersecting at two points the marginal band strips thereof and said edges carrying said strips so that an article is produced having an opening formed by the intersected edges of said band strips and sheet sections.

4. A machine of the character described comprising means for feeding two sheets of rubber to opposed juxta-relation, mechanisms arranged in advance of the point of sheet association for applying a narrow band strip along a medial line of each sheet and splitting said sheets and strips along a medial line of the latter and joining the split edges of said opposing strip and sheet sections, whereby two pairs of opposed sheet sections are fed through the machine, means for unfolding the band strips to provide extensions of said sheet sections, means for cutting each pair of superposed sheet sections on a line intersecting the free edge of the marginal band strips at two points, said cutting means joining the severed edges of the opposed sheets together during the cutting operation so that an article is produced having an opening formed by the intersected edges of said band strips.

5. A machine of the character described comprising means for feeding two sheets of rubber to opposed juxta-relation, mechanisms for applying a narrow band strip along a medial line of each sheet and splitting said sheets and strips along a medial line of the latter and joining the split edges of said opposing strip and sheet sections, whereby two pairs of opposed sheet sections move through the machine, means for unfolding the band strips to provide extension of said sheet sections, and means for cutting each pair of opposed sheet sections on a line, intersecting at two points the free edge of the band strips.

6. A machine of the character described comprising means for feeding two sheets of rubber to opposed juxta-relation, mechanisms arranged in advance of the point of sheet association for applying a narrow band strip of rubber along a medial line of each sheet and splitting said sheets and strips along a medial line of the latter and joining the split edges of said opposing strip and sheet sections whereby two pair of opposed sheet sections move through the machine, means for spacing the split edges of the sections a distance equal at least to twice the width of said severed band strips thereon, whereby two pair of opposed sheet sections move through the machine, means for unfolding the band strips in the space provided between said sheet sections, and means for cutting each pair of opposed sections at spaced intervals along their length and between jointed portions thereof on lines, the ends of which intersect the free edge of the band strips at two points, said means joining the severed edges of the opposed sheets together during the cutting operation.

7. A machine of the character described comprsing means for feeding two sheets of rubber to opposed juxta-relation, mechanisms arranged in advance of the point of sheet association for applying a narrow band strip of rubber along a medial line of each sheet and splitting said sheets and strip along a medial line of the latter and joining the split edges of said opposing strip and sheet sections, said feeding means including rollers engageable by said split sections, means on the rollers for spacing the split edges of the sections a distance equal at least to twice the width of said split band strips thereon, means for unfolding the band strips in the space provided between said sheet sections, and means for cutting each pair of opposed sheet sections on a line the ends of which intersect the free edges of the band strips at two points, said means joining the severed edges of the opposed sheets together during the cutting operation.

8. A machine of the character described comprising means for feeding two sheets of rubber to opposed juxta-relation, mechanisms arranged in advance of the point of sheet association for applying a narrow band strip of material along a medial line of each sheet and splitting said sheets and strip along a medial line of the latter and joining the split edges of said opposing strip and sheet sections, said feed means including rollers engageable by each sheet and having circumferential series of reciprocating members for contacting each split section of each sheet and shift said sections to space the adjacent split edges of the sections a distance equal at least to twice the width of said severed band strips thereon, means for unfolding the band strips in the space provided between said sheet sections, and means for cutting each pair of opposed sheet sections on a line whose ends intersect the free edges of the band strips at two points.

9. A machine of the character described comprising means for maintaining two sources of supply of sheet rubber, conveyors adjacent each source of supply for continuously feeding said sheets therefrom, mechanisms one at the discharge end of each conveyor to operate on the sheet fed therefrom and including means for feeding a narrow band strip of rubber along a medial line of its respective sheet and further including a knife for severing said sheet and strip along a medial line of the latter and simultaneously joining the severed edges of said opposing strip and sheet sections, a spreading roller positioned near each of said mechanisms, respectively, to receive therefrom said split sheets and having means thereon for spacing the severed edges of the sections a distance equal at least to twice the width of said severed band strips thereon, an assembling conveyor, unfolding means receiving said split sheet from each spreading roller for unfolding the free edge of the band strips into the space provided between said sheet sections and delivering said split sheets on said assembling conveyor with corresponding sections of each sheet in superposed relation.

10. A machine of the character described comprising means for maintaining two sources of supply of sheet rubber, conveyors adjacent each source of supply for continuously feeding said sheets therefrom, mechanisms one at the discharge end of each conveyor to operate on the sheet fed therefrom and including means for feeding a narrow band strip of rubber along a medial line of its respective sheet and further including a knife for severing said sheet and strip along a medial line of the latter and simultaneously joining the severed edges of said opposing strip and sheet sections, a spreading roller positioned near each of said mechanisms, respectively, to receive therefrom said split sheets and having means thereon for spacing the severed edges of the sections a distance equal at least to twice the width of said severed band strips thereon, an assembling conveyor, unfolding means receiving said split sheet from each spreading roller for unfolding the free edge of the band strips in the space provided between said sheet sections and delivering said split sheets on said assembling conveyor with corresponding sections of each sheet in superposed relation, and means for cutting each pair of sheet sections at spaced intervals along their length and between jointed portions thereof on a line intersecting at two points the free edge of the band strips, said means joining the severed edges of the opposed sheets together during the cutting operation.

11. In a sheet splitting mechanism, a roller over which a sheet of material passes, a second corrugated roller journalled to bear against said first roller for feeding a second sheet of material therebetween and around the first roller to opposed relation with said first sheet, and means co-operating with the first roller for severing said opposed sheets.

12. In a splitting mechanism, a roller and a knife journalled in co-operating opposite relation and between which a sheet of material is fed, a strip folding device, a second roller journalled opposite said first roller to co-operate therewith for feeding a strip of material through said folder, pressing the folds together between said rollers and passing the same around the first roller to opposed relation with said first sheet whereby said opposed sheets are simultaneously severed by said knife.

13. In a sheet splitting and joining mechanism, a roller and a rotary knife journalled in co-operating opposite relation and between which a sheet of rubber is fed, a sheet folding device, a second roller journalled opposite said first roller to co-operate therewith for feeding a second sheet of rubber through said folder, adhering the folded surfaces together between said rollers and passing the same around the first roller to opposed relation with said first sheet whereby said opposed sheets are simultaneously severed by said knife, said knife being constructed to join the severed edges of opposed split sheets during the cutting operation.

14. In a mechanism for spreading severed sections of sheets, a feeding roller over which said severed sections pass, means adapted to contact with said sheet sections while on said roller and move the same in spaced relation.

15. In a mechanism for spreading severed sections of sheets, a feeding device over which said severed sections pass, shiftable means to contact with said sheet sections while on the feeding device and move the same apart in spaced relation, and means for shifting said shiftable means.

16. In a mechanism for spreading severed sections of sheets, a roller over which said severed sections pass, shiftable means on the roller to contact with said sheet sections and move the same in spaced relation, and means for reciprocating said shiftable means.

17. In a mechanism for spreading severed sections of sheets, a roller over which said sections pass, a plurality of progressively shiftable members on the roller contacting with each sheet section to move the same in spaced relation with respect to adjacent sections.

18. In a mechanism for spreading severed sections of sheets, a roller over which said sheet sections pass, said roller having axial slots therein arranged in a plurality of circumferential spaced series, a sheet engaging device slidably mounted in each slot, cam means for reciprocating said engaging devices successively, as the roller rotates, and for alternately causing said engaging devices to engage and disengage said sheet sections, whereby the severed sections of the sheet are engaged by said engaging devices and spaced apart as they pass over said rollers.

19. In a mechanism for spreading severed sections of sheets, a roller over which said sheet sections pass, said roller having axial slots therein arranged in a plurality of spaced circumferential series, a member slidably mounted in each slot, a spreading element mounted on each member to engage an edge portion of a sheet section between it and its respective member, cam means for reciprocating said members and for alternately causing said spreading elements to successively engage and disengage said sheet sections as the roller rotates whereby the several sheet sections are engaged by said spreading elements and spaced apart by the shifting of said members as they pass over said rollers.

20. In a mechanism for spreading severed sheet sections, a roller over which said sheet sections pass, said roller having axial slots therein arranged in a plurality of spaced circumferential series, each series positioned to underlie an edge of a sheet section passing over the roller, a member slidably mounted in each slot and having an opening therein, a spreading element mounted in said opening to engage an edge portion of a sheet section between it and its respective member, cam means for reciprocating said member successively on each revolution of said roller, and independent means for operating each element to sheet engaging position in one direction of movement of its respective member and to sheet disengaging position on its reverse movement, whereby the sheet sections may be moved in spaced relation.

21. In a mechanism for spreading severed sheet sections, a roller over which said sheet sections pass, said roller having axial slots therein arranged in a plurality of spaced circumferential series, each series positioned to underlie an edge of a sheet section passing over the roller, a member slidably mounted in each slot and having an opening therein, a gripping finger pivotally mounted in said opening to grip an edge of a sheet section between it and its respective member, cam means for reciprocating said member successively on each revolution of said roller, a reciprocable rod mounted in each of said members and operatively connected with the finger thereof, a cam means for actuating said rods to move their respective fingers to gripping position on one direction of movement of their respective members and to open position on their reverse movement whereby the sheet sections may be moved in spaced relation.

22. In a mechanism for spreading severed sheet sections, a roller over which said sheet sections pass, said roller having axial slots therein arranged in a plurality of spaced circumferential series, each series positioned to underlie an edge of a sheet section passing over the roller, a member slidably mounted in each slot and having an opening therein, a gripping finger pivotally mounted in said opening to grip an edge of a sheet section between it and its respective member, cam means for reciprocating said members successively on each revolution of said roller, a reciprocable rack bar mounted in each of said members and meshing with a gear on said finger thereof, a cam means for actuating said rods to move their respective fingers to gripping position on one direction of movement of their respective members and to opened position on their reverse movement, whereby the sheet sections may be moved in spaced relation.

23. In a device for unfolding adjacent folded edges of sheet sections comprising plate members arranged edge to edge and over which said sections pass, flanges associated with opposing edges of the plates and extended at an angle to the face thereof and having their ends merging into said plates.

24. In a device for unfolding adjacent folded edges of sheet sections comprising plate members arranged edge to edge and over which said sections pass, flange strips at the opposing edges of the plates and extending diagonally of the plates and with their intermediate portions at an angle to the surface thereof.

25. In a device for unfolding adjacent folded edges of sheet sections comprising plate members edge to edge and over which said sections pass, flange strips at the opposing edges of the plates and extending diagonally of the plates and at an angle to the surface thereof, and a guide rib on each plate to engage a seam of said sheet sections to prevent lateral shifting of the sections relative to plates while being unfolded.

26. In a device for unfolding adjacent folded edges of sheet sections comprising plate members arranged edge to edge and over which said sections pass, opposing edges of said plate converging, flanges associated with the said converging plates edges and extended coincidence therewith, said flanges having their intermediate portions at an angle to one surface of the plate and having their ends merging into the plate surfaces.

27. In a device for unfolding adjacent folded edges of sheet sections comprising plate members arranged edge to edge and over which said sections pass, opposing edges of said plate converging, flanges associated with the said converging plates edges and extended coincidence therewith, said flanges having their intermediate portions at an angle to one surface of the plate, and adjustable supporting means for the plate permitting lateral adjustment relative to each other.

28. In a machine for assembling sheets of rubber in opposed relation, a roller over which said opposed sheets pass, a member arranged in opposite co-operating relation with said roller for joining said sheets together at spaced intervals in their area whereby the opposed sheets are held in aligned position.

29. In a machine for assembling sheets of rubber in opposed relation a roller over which said opposed sheets pass, a rotatable member arranged in opposite co-operating relation with said roller and having means thereon for joining said sheets together at certain positions in their area whereby the opposing sheets are held in aligned position.

30. A machine for the automatic production of articles made of sheet material comprising means for feeding two sheets of rubber to opposed juxta-relation, mechanism for applying a narrow band strip along a medial line of each sheet and splitting said sheets and strips along a medial line of the latter and joining the split edges of said opposing strip and sheet sections, whereby two pairs of opposed sheet sections may move through the machine after sheet association, and means for cutting each pair of opposed sheet sections on lines intersecting the free edge of said band strips.

31. A machine for the automatic production of articles made of sheet material comprising means for feeding two sheets of rubber to opposed juxta-relation, mechanism for splitting each of said strips along a medial line, whereby two pairs of opposed sheet sections are fed through the machine after sheet association, means for moving the split sections of each respective sheet so that their split edges are separated, and means for cutting each pair of opposed sheet sections at spaced intervals along their length to produce the desired articles from said opposed sheet sections.

In testimony whereof we have hereunto set our hands.

JACOB STEIN.
MORRIS KATCHER.